Patented Apr. 20, 1937

2,077,539

UNITED STATES PATENT OFFICE 2,077,539

ACID WOOL DYESTUFFS OF THE ANTHRA-QUINONE SERIES

Klaus Weinand, Leverkusen-I. G. Werk, and Curt Bamberger, Cologne-Mulheim, Germany, assignors to General Aniline Works, Inc., New York, N. Y., a corporation of Delaware No Drawing. Application November 7, 1935, Serial No. 48,778. In Germany November 16, 1934

3 Claims. (Cl. 260—60)

The present invention relates to new acid wool dyestuffs of the anthraquinone series.

In accordance with our present invention new acid wool dyestuffs of the anthraquinone series are obtained by introducing in an anthraquinone body into both α-positions of the one nucleus a hydroarylamino group and into one β-position of the other nucleus a sulfamide sulfonic acid group. The hydroaryl groups are preferably of the hexahydro benzene series, examples for suitable groups being the hexahydroaniline, the hexahydro-para-toluidine, the hexahydro-orthotoluidine and the hexahydro-para-anisidine group. The term "sulfamide sulfonic acid groups" indicates sulfamide groups which contain the residue of an aliphatic or aromatic sulfonic acid attached to the nitrogen of the amido group. Suitable examples for aliphatic or aromatic sulfonic acid groups are the residue of the ethane sulfonic acid, propane sulfonic acid, benzene sulfonic acid, toluene sulfonic acid and naphthalene disulfonic acid. The other hydrogen atom of the sulfamido group may be replaced by an alkyl group such as methyl or ethyl.

The preparation of our new acid wool dyestuffs can be effected by causing hydroaryl amines to react upon β-anthraquinone sulfamide sulfonic acids which contain easily exchangeable substituents in both α-positions of the other nucleus. Another method of working consists in first introducing easily exchangeable groups such as halogen atoms into both α-positions of the one nucleus, replacing the same by hydroaryl amino groups and then introducing a sulfamide sulfonic acid group into a β-position of the other nucleus. Our new dyestuffs may be defined as anthraquinones which contain a hydroaryl amino group in both α-positions of the one nucleus and a sulfamide sulfonic acid group in one β-position of the other nucleus. These new dyestuffs are easily soluble in water and dye wool from an acid bath clear blue shades of excellent fastness to light.

The following examples illustrate the invention without, however, restricting it thereto, the parts being by weight:—

Example 1

10 parts of 1,4-dichloroanthraquinone-6-sulfomethyltauride (obtainable from 1,4-dichloroanthraquinone-6-sulfonic acid chloride and methyltaurine) are heated to boiling for 6–8 hours in 400 parts of water with the addition of 30 parts of hexahydroaniline, 1 part of copper sulfate and 4 parts of a caustic soda solution. On cooling the 1,4-dihexahydroanilidoanthraquinone-6-sulfomethyltauride is precipitated, sucked off and redissolved from water. The dyestuff dyes wool from an acid bath clear greenish-blue shades.

Dyestuffs of similar properties are obtained by replacing the hexahydroaniline by hexahydroortho- or para-toluidine or hexa-hydro-para-anisidine.

Example 2

10 parts of 1,4-dichloroanthraquinone-6-sulfomethlyanilido sulfonic acid (obtainable from 1,4-dichloroanthraquinone-6-sulfochloride and methyl aniline while subsequently sulfonating the methylanilide thus obtained) are heated to boiling for 6–8 hours in 400 parts of water with the addition of 30 parts of hexahydroaniline, 1 part of copper sulfate and 4 parts of a caustic soda solution. On cooling the 1,4-dihexahydroanilidoanthraquinone-6-sulfomethylanilidosulfonic acid is precipitated, sucked off and rinsed by dissolving in water. The dyestuff dyes wool from an acid bath clear greenish-blue shades.

The dyestuff mentioned above can also be obtained by causing 1,4-dichloroanthraquinone-6-sulfomethylanilide to react upon hexahydroaniline in the usual manner and then sulfonating at room temperature.

We claim:—

1. The products of the formula:—

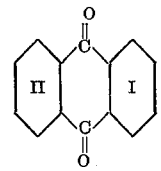

which contain in both α-positions of the nucleus marked I an hexahydroaryl amino group wherein the aryl is of the benzene series and a sulfamide sulfonic acid group in one β-position of the nucleus marked II.

2. The products of the formula:—

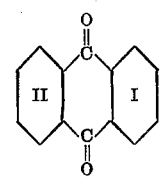

which contain in both α-positions of the nucleus marked I an hexahydroaryl amino group wherein the aryl is of the benzene series and in one β-position of the nucleus marked II a sulfamide group which bears an alkyl sulfonic acid group attached to the nitrogen of the sulfamide group.

3. The products of the formula:—

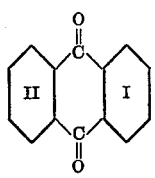

which contain in both α-positions of the nucleus marked I an hexahydroaryl amino group wherein the aryl is of the benzene series and in one β-position of the nucleus marked II the following group:—

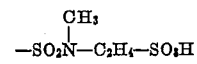

KLAUS WEINAND.
CURT BAMBERGER.